United States Patent [19]

Silvis

[11] Patent Number: 4,668,398

[45] Date of Patent: May 26, 1987

[54] CONTINUOUS EXTRACTION APPARATUS AND PROCESS

[75] Inventor: Salvatore J. Silvis, Staten Island, N.Y.

[73] Assignee: Colgate-Palmolive Company, New York, N.Y.

[21] Appl. No.: 765,899

[22] Filed: Aug. 14, 1985

Related U.S. Application Data

[63] Continuation of Ser. No. 515,773, Jul. 21, 1983, Pat. No. 4,571,299.

[51] Int. Cl.⁴ .............................................. B01D 11/04
[52] U.S. Cl. .................................... 210/634; 210/511; 260/419; 422/259
[58] Field of Search .............................. 210/634, 511; 252/367–370; 422/258, 259; 260/419

[56] References Cited

U.S. PATENT DOCUMENTS

| | | | |
|---|---|---|---|
| 2,072,382 | 3/1937 | Robinson | 422/259 |
| 2,218,080 | 10/1940 | Bottaro | 210/511 |
| 2,493,265 | 1/1950 | Scheibel | 422/259 |
| 2,562,783 | 7/1951 | Gallo et al. | 422/259 |
| 2,665,196 | 1/1954 | Poffenberger | 422/259 |
| 2,850,362 | 9/1958 | Scheibel | 422/259 |
| 3,190,900 | 6/1965 | Godet et al. | 260/419 |
| 3,318,668 | 5/1967 | Ziehl | 422/259 |

FOREIGN PATENT DOCUMENTS

| | | | |
|---|---|---|---|
| 1217832 | 12/1970 | United Kingdom . | |
| 417144 | 9/1974 | U.S.S.R. | 422/258 |
| 465210 | 6/1975 | U.S.S.R. | 422/258 |

*Primary Examiner*—Richard V. Fisher
*Assistant Examiner*—W. Gary Jones
*Attorney, Agent, or Firm*—Richard N. Miller; Murray M. Grill; Herbert S. Sylvester

[57] ABSTRACT

A continuous extraction apparatus and a continuous extraction process for extracting an extractable component of a liquid or particulate feed material with an immiscible liquid solvent for the extractable component thereof, which apparatus and process are both especially useful for extracting glycerine from soap, utilize an extraction column with oscillatably movable contact promoting means therein which move in a horizontal plane and have openings therein through which the immiscible feed and the extracting liquid, in different phases, may pass during oscillations, at which time the contact promoting means make repeated contacts with the different phases to renew contact surfaces of the liquids and to bring them into intimate contact with each other, whereby extraction of extractable material from the feed by the extracting liquid is promoted. A plurality of spaced vertical screens positioned substantially radially from the axis of a cylindrical extraction column constitute preferred contact promoting means which oscillate rotationally and horizontally and thereby help to improve extraction column efficiency while preventing or minimizing axial mixing. Instead of the screens a woven or knitted screening, mesh or fabric of filamentary material, having openings therein, may be used and may be wrapped around or otherwise suitably held to a central vertical shaft which is rotationally oscillatable horizontally in the extraction column.

10 Claims, 7 Drawing Figures

CONTINUOUS EXTRACTION APPARATUS AND PROCESS

This is a continuation of application Ser. No. 515,773 filed July 21, 1983 now U.S. Pat. No. 4,571,299 is Feb. 18, 1986.

This invention relates to apparatuses and processes for continuously extracting extractable material from a liquid or particulate solid material with an immiscible extracting liquid. More particularly, it relates to a vertically oriented extraction apparatus wherein improved contacts between feed material and extractant phases, and renewals of contacting surfaces thereof, are obtained by horizontal oscillating rotational movement of contact promoting means, such as evenly spaced and radially positioned vertical screens or wrapped-around screening, mesh or fabric, and to processes wherein such apparatus is employed, such as processes in which glycerine is separated from soap by extraction with an aqueous electrolyte solution.

Extraction columns have been employed to extract materials by bringing such materials into contact with immiscible extracting liquids in which the extractable materials are soluble. Preferably such extraction columns are vertically oriented and cylindrical in shape, with relatively high length:diameter ratios. Both concurrent and countercurrent flows of immiscible feed and extracting liquid have been employed but often it will be preferable for the materials to be of different densities and for the movement of the material of greater density to be downwardly, with it being fed to the extraction column near the top thereof and being removed near the bottom. The flow direction of the other material will be upward, with its inlet near the bottom and its outlet near the top. Often the top outlet will be above the top inlet and the bottom outlet will be below the bottom inlet, providing settling volumes in the column so that the materials to be removed are not re-mixed with those materials being fed to the column nearby.

Extraction columns have been made with movable parts therein to promote contact of the immiscible liquids and such movable parts have been located on axially positioned rotating shafts. In some instances longitudinally oscillating mechanical means have been present in the extractor and in others pulsed columns are employed. Sometimes horizontal and/or vertical separators have been located at intervals along the length of the extractor to produce different but interconnected extraction zones. Rotational movements of an agitator or agitators which have been installed in the column tend to produce swirling motions which promote undesirable axial mixing, reducing the efficiency of extraction. Axially oscillating mixers or pulsators have similar effects. Separators located axially along the column, baffles or mixers, all of which normally increase the consumption of mixing energy, raise the cost of operating the extracting column and require the employment of more powerful mixing equipment, which are significant disadvantages of apparatuses incorporating such features.

In accordance with the present invention a continuous extraction apparatus, useful for extracting extractable material from a liquid or particulate feed material with an extracting liquid which is immiscible with the feed material and is in a different phase, comprises a hollow vertical column, first inlet means in an upper or lower part of the column for adding to the column a liquid or particulate feed material containing an extractable material to be extracted therefrom, first outlet means for removing from the other such part of the column a raffinate of the feed material, of a reduced content of the material to be extracted, second inlet means for adding to the part of the column from which the raffinate is removed an extracting liquid which is immiscible with and of a different density from both the feed material and the raffinate, being heavier or lighter than both, second outlet means for removing such extracting liquid, with extracted material therein, from the part of the column in which the feed liquid is added, and movable contact promoting means in the column, oscillatably movable horizontally and having openings therein through which the immiscible phases may be passed during oscillations of the contact promoting means, which contact promoting means renew interfacial contact surfaces of the materials of the immiscible phases and bring the phases into more intimate contact with each other by making repeated contacts therewith during oscillating movements thereof.

The contact promoting means preferably comprise vertical screens but especially when liquid phases are present such may be replaced by screening, mesh or fabrics made of filamentary material, which is held to a central vertical shaft and which is rotationally oscillatable with it. In a preferred embodiment of the apparatus the contact promoting means will be a series of equally spaced, radially positioned vertical screens extending through the extraction zone of the apparatus. It has been found that the wires of the screen promote the desired contacts and surface renewals with a minimum of axial mixing and without causing the consumption of excess energy during oscillations.

According to the process aspect of this invention a process for extracting an extractable material from a feed material with an extracting liquid which is immiscible with the feed and is of a different density from it and from a raffinate resulting from the extraction comprises passing a feed material containing an extractable material vertically in one direction through an extraction zone, passing an extracting liquid vertically through the zone in an opposite direction in such manner that the immiscible material and extracting liquid are in contact, and moving contact promoting means (having openings therein) in oscillatory motion horizontally in such extraction zone to promote surface renewals and intimate contacts of the immiscible phases, as such phases are contacted by the moving contact promoting means, as such means are being oscillatingly moved. A preferred process is one in which glycerine is removed from soap, but the process has many other commercially useful extraction applications too. Instead of employing two immiscible liquid phases the feed may be a particulate solid.

A search of the prior art has resulted in the finding of the following patents which may be considered to be of some relevance to the present invention, although none of them illustrates, discloses or suggests the invention or the oscillating rotational horizontal movement of contact promoting means to improve contacts between an immiscible feed and an extracting liquid in an extraction column without undesirable axial mixing, excessive power consumption and/or loss of extraction efficiency.

What appears to be the closest prior art patent is U.S. Pat. No. 2,562,783 (Gallo et al.) which describes a vertical countercurrent extraction tower for liquid-liquid extraction, having an axial shaft which causes the rotations of several wire paddles, producing helical flows of liquids through the tower. The Gallo et al. patent also shows baffles located between different levels of wire paddles and it is taught in the patent that the wire baffles cause periodic redispersion of the liquids in the tower. Although it is said in the Gallo et al. patent that increased extraction efficiency is obtained, compared to an ordinary packed tower with relatively large packing material, it is considered that the efficiency of the Gallo et al. tower is considerably less than that of the extraction column of this invention. Such lower extraction efficiency is believed to be caused by the swirling motions of the liquids and the resulting axial mixings, lack of oscillatory motion of the Gallo et al. paddles, the presence of the baffles and the absence of continuous vertical screening members which extend through all or substantially all of the extraction zone of the column.

U.S. Pat. No. 3,318,668 describes a countercurrent extraction column containing mixer blades adapted for rotation and vertical (axial) oscillation but it is clear that such oscillation is counterproductive because it promotes axial mixing. Also, this patent does not teach the use of contact promoting screening or similar material. Other patents noted include U.S. Pat. Nos. 2,072,382; 2,493,265; 2,665,196; 2,850,362; and 3,190,900. The mentioned patents show various extracting columns, some of which include mechanical mixers, separating platforms, packing materials and/or pulsing means. However, none of them discloses or suggests utilization of horizontal oscillatory rotational movement of a screen or similar device to promote contact between an immiscible feed material and an extracting liquid without producing objectionable axial flows.

The invention will be readily understood by reference to the description in this specification and from the drawing wherein.

FIG'S. 3-A and 3-B together illustrate a laboratory apparatus of the invention, comparable in operation to that of FIG. 1.

Figure 1:
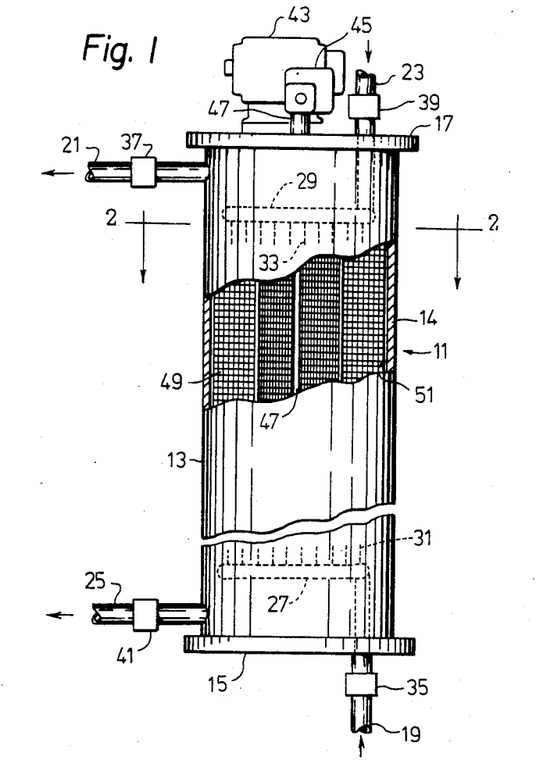
FIG. 1 is a partially cut-away elevation of a preferred embodiment of the apparatus of this invention, with six vertical contact promoting screens shown for purpose of illustration.

In FIG. 1 continuous extraction apparatus 11, which is useful for extracting extractable material from a liquid or particulate feed material with an extracting liquid which is immiscible, substantially immiscible or even partially immiscible with the feed material and is in a different phase, includes a hollow vertical column 13, having a cylindrical wall 14, a flat plate bottom 15 and a flat plate top 17. Column 13 may be fabricated of any suitable material for the intended purpose but often stainless steel or other alloy steel, synthetic organic polymeric plastic, e.g., polypropylene, polyethylene, PVC, PTFE, glass or glass lined steel may be preferred. Inlet 19 is an inlet to the column for a lighter material, which may be either the extractable feed material or the solvent, and outlet 21 is for removal of such material after completion of the extraction process. Inlet 23 is for charging of the heavier material to column 13 and outlet 25 is for its removal after completion of the extraction. Circular distribution rings 27 and 29 are provided for distributing the charged materials evenly throughout the cross-section of the column so as to promote better extraction. Such distributors have suitably spaced openings in the top and bottom thereof, facing downwardly and upwardly, respectively, toward the column middle, and the flow of material from the distributors is indicated by dashed lines 31 and 33. Metering valves 35, 37, 39 and 41 and/or shut-off valves at similar locations are provided to control relative flows of extractable material and extracting solvent through the column. In many instances proportioning pumps, rotameters and/or mass flow-meters are used.

On cover 17 there is positioned motor 43 and converter 45, which converts the rotational motion of the motor drive shaft to oscillating motion, which oscillating motion is transmitted to rotor 47. The combination of the motor and converter permits regulation of the angle and frequency of rotational oscillation. Circular shaft 47 is positioned vertically and extends the length of column 13, usually fitting in bearing means at the bottom of the column to maintain its axial position and the trueness of its rotational oscillations. Fastened to the shaft so that they oscillate with it are six planar vertical screens 49, four of which are shown in FIG. 1.

Figure 2:
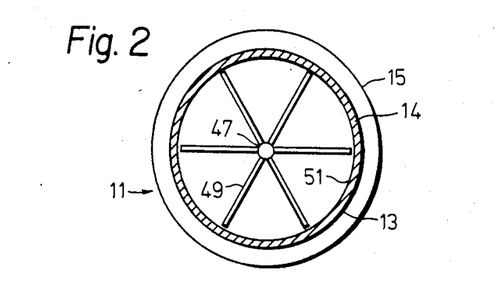
FIG. 2 is a horizontal section of the apparatus of FIG. 1 taken along plane 2—2, omitting piping and distributor ring.

In FIG. 2 the six screens 49, each of which is held to vertical shaft 47, are shown extending radially from vertical shaft 47 to near inner wall 51 of column 13.

Figure 3:
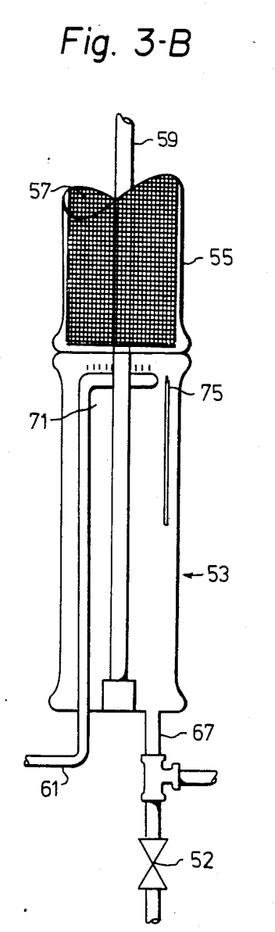

In FIG. 3 (FIG'S. 3-A and 3-B) laboratory structure similar to that shown in FIG'S. 1 and 2 is illustrated but with wrapped around screening, knitted wire mesh, e.g., demisting material, or other contact means of the type described herein (having openings in it) being held in contact with a rotationally oscillatable shaft so as to promote contact between the different phases in the extractor. As illustrated, continuous extraction apparatus 53 includes column 55, containing a rotationally oscillatable screenlike or openwork contact means 57 held to shaft 59. When, for example, the apparatus is used for extraction of glycerine from soap with an electrolyte, such as an aqueous solution of sodium chloride and sodium hydroxide, the soap in liquid state (and containing enough water to keep it liquid) enters the column through line 61 and exits, after having had glycerine removed from it, through line 63. The aqueous electrolyte, normally including sodium chloride and sodium hydroxide, enters the column through inlet line 65 and exits through outlet 67. Distributors 69 and 71 are provided for the electrolyte and soap, respectively. Thermocouple probes or means for measuring other internal characteristics of the materials in the column are provided at 73 and 75. Such are connected by wires, such as those designated 77 and 79, to meters or digital readout equipment, not illustrated. Other valves fittings and lines (not numbered) are illustrated in FIG. 3, and represent means for adding and removing solvent, steam or other cleaning means to/from the column so that it may be readily cleaned between uses. In the illustration of FIG. 3 metering and other valves for the control of material flows to and from the column are not illustrated but such means or equivalents will usually be provided, such as those illustrated in FIG. 1.

When, as in the case of soap from which glycerine is to be removed, the feed material should be kept hot or warm to maintain its fluidity, heating means, such as wraparound steam coils or a steam or hot water jacket, not illustrated, may be provided. For laboratory equipment such as that of FIG. 3, a steam tracer or an electrical resistance heater may be helically wound about the column. Of course, such heaters may be thermostatically controlled to maintain the desired temperature of materials in the column.

The invention is usually employed for continuous liquid-liquid extractions but may also be used to extract materials from particulate solids, which may be fed to the extracting column, using an appropriate continuous feeder, rather than the distributor rings illustrated in FIG'S. 1 and 3, which could become plugged by such particles. Also, when particulate feed material is present, vertical horizontally rotationally oscillatable screens, such as those of FIG. 1, will be highly preferred because they act better to clear themselves, during direction alternating movements, of any particles which might otherwise become attached thereto and block the screens.

Figure 4:
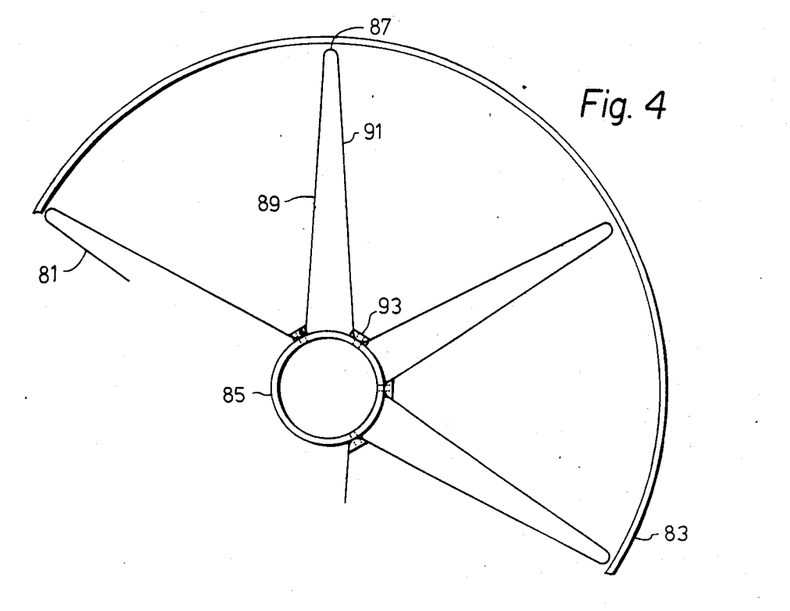
FIG. 4 is a top plan view of a portion of an embodiment of contact promoting means of this invention shown in an extraction column from which the cover has been removed.

In FIG. 4 there is shown an embodiment of the invention in which the radial screening 81 is continuous and each of the six regularly spaced screens is, in effect, a double screen. Thus, column 83 includes a vertically positioned tubular shaft 85 of circular shape with screening 81 being bent into star shape, each of the "points" of the star, such as that designated 87, having sides 89 and 91. Between the different "points" of the star the screening 81 is held to hollow tubular shaft 85 by fastening means 93, which may be suitably shaped threaded bolts that screw into threaded holes in shaft 85. If desired, stiffening means, not shown, may be associated with the screens to help them to maintain their shapes satisfactorily during use. Although no elevational view of the contact promoting means of FIG. 4 is included in the drawing it is to be understood that the screens will extend the length of the extraction zone and fasteners 93 or other suitable fasteners will be suitably spaced along shaft 85 so as satisfactorily to hold the screening to the shaft.

Figures 5, 6:
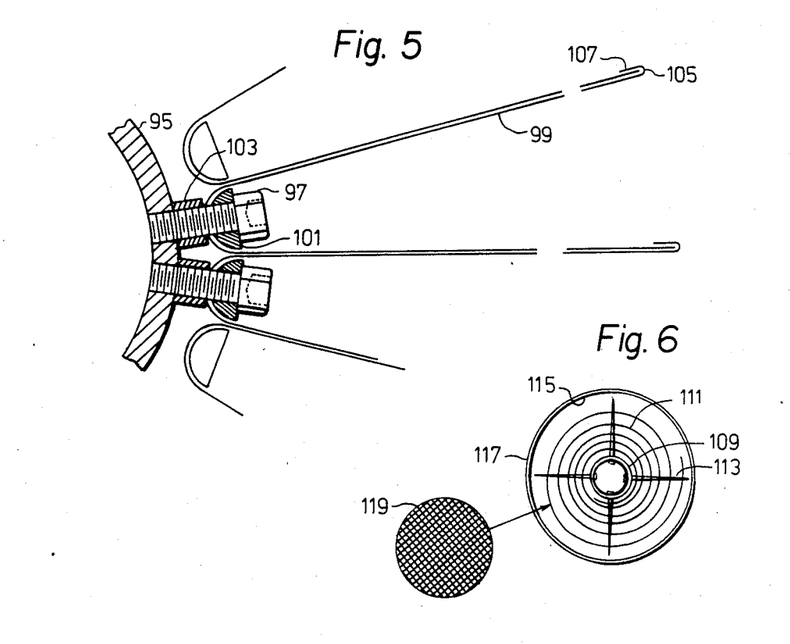
FIG. 5 is a partially sectioned plan view of another embodiment of contact promoting means of the invention.
FIG. 6 is a top plan view of another embodiment of the apparatus of this invention with the cover removed.

In FIG. 5 another embodiment of the contact promoting means is illustrated in which screening, hardware cloth, coarser mesh material or other suitable material having openings therein is bent into elongated modified U-shape and fastened to a shaft. As illustrated, shaft 95 has threaded openings therein into which socket headed threaded bolts 97 fit. Screening 99 is bent to a slightly opened U or V shape, as illustrated, and is fastened to shaft 95 by bolt 97, using shaped adapter 101 and spacer 103, both of which are optional. At end 105 screening 99 may be bent over, as shown at 107, to hold to an adjoining screen end and thereby stiffen both such parts. Such joinders may be effected between the various adjacent screens, as illustrated. Alternatively, the U-shaped screens may be spaced farther apart so as not to contact the closest of the other screens. In such cases it will usually be desirable to bend over both ends 105 of all the screens as indicated by numeral 107, for edge strengthening purposes. As with FIG. 4, no elevational view is shown of the structure of FIG. 5 but it is to be understood that fasteners 97 will be located at suitable intervals along the length of shaft 95 to satisfactorily hold screens 99 in position along the length of the extraction zone. Alternatively, and this may be performed with respect to the screens of FIG. 4 too, vertical contact strips, shaped in cross-section like adapters 101 or of other suitable shapes, may extend for the lengths of the screens, and may have holes therein for bolts 97. Such adapters may preferably be employed in some structures, usually with a saving in the number of bolts used to fasten the screens.

FIG. 6 shows somewhat schematically the wrapping around vertical shaft 109 of a preferred knitted metal filamentary de-mister - type cloth 111. Such cloth is known for its high percentage of voids, often up to about 97%, which allows ready movement of mobile materials through openings therein. Although only 5 or 6 layers of the cloth are shown in the illustration, many more may be employed, e.g., 40. To fasten the cloth in desired position with respect to the shaft 109, so that it oscillates with the shaft, spikes 113 or other suitable holding means may be employed. Similarly, to maintain the desired wrapping density of the cloth or knitted material the end thereof may be welded or otherwise held to the preceding layer, so that the cloth extends to near to the inner wall 115 of column 117. The general appearance of one cloth or screening employed is illustrated somewhat schematically at 119.

The apparatus and process aspects of this invention depend on oscillating horizontal movement of the extracting medium and the feed material containing or mixed with a material extractable by the extracting medium. Both media are at least partially immiscible (with one not being dissolved in the other), are maintained in separate phases in an extracting zone or apparatus and are each moving vertically in different directions in such zone or apparatus. The invention also applies to apparatuses and processes wherein the extracting zone is not vertical and in which the oscillating movement is at right angles to the paths of the materials through the extracting zone. However, as a practical matter, and to avoid gravitational effects which could interfere with the extraction by causing the oscillating movements to have an axial component, normally the extracting zone or column will be vertical, the paths of the extracting medium and the feed containing extractable material will be in opposite directions vertically and the oscillating movement imparted to the two phases, which will normally be substantially or completely immiscible with each other, will be horizontal.

Extracting columns are well known and that of this invention may be substantially like previous columns (omitting any phase contact improving features thereof except the distributors) but with the contact improving means of this invention included.

The extraction zone, which is preferably in a hollow vertical cylindrical column, may have any suitable inlets and outlets therein which are so located that they do not interfere with each other, as by feed entering the column being swept out quickly with the extracting liquid plus extract (sometimes called purified extract). Generally there will be, as are illustrated in the drawing in FIG'S. 1 and 3, zones above and below the distributors (the actual inlets) which are sometimes referred to as settling zones, wherein the raffinate and purified extract do not have extracting medium and feed, respectively, mixed with them. Such settling zones give the immiscible phases an additional opportunity to separate cleanly. (Incidentally, it should be noted that the continuous phase of the immiscible phases may be charged to the extraction zone without the use of a distributor but the illustrated apparatus is useful whether the heavier or lighter phase is continuous). The extent of separation in the settling zones and the relative axial or vertical motion between the immiscible phases depend to some extent on the densities of such phases. Normally, such densities will be different enough so that the gravitational effect will separate the two phases within a reasonable time, using the described equipment. The phase densities will usually differ by at least about 0.02 to 0.1 g./ml., with the usual range of differences being from 0.03 to 0.4 g./ml. However, the process may also be employed for density differences outside such ranges, especially for greater differences, although for lesser differences separating problems may be encountered. Normally it is desirable for the density difference to be at least 0.04 g./ml. between the various compositions of the immiscible phases, i.e., between the feed and the raffinate on the one hand and the extracting solvent and the purified extract on the other.

The contact promoting means employed, which rotationally oscillate horizontally, may have openings in the range of 1 to 30 mm. across, often preferably being 4 to 15 mm. Often a high free volume of the screening, woven or filamentary material is desirable and generally such will be at least 50%, often being in the range of 50 to 98%, with percentages of free volumes or areas of openings often being in a lower portion of such range for screening and in a higher portion for knitted filamentary material, such as that sold for de-misting purposes, e.g., about 97%. Preferably the area of the openings in the screening will be at least 60%, often being in the range of 60 to 80%. Still, it is desirable for the filamentary material to provide maximum wire strands for impacting the dispersed phase and for mixing. This helps to maximize the driving force for extraction (the difference in concentrations of extractable material between the dispersed and continuous phases), and it thins any separating film between the phases. However, the sizes of the openings between the wires should be such that resistance to the movements of the wires is minimized.

The angle of oscillation and the frequency of oscillation are interrelated, with frequency being limited as the angle increases. Thus, it is desirable not to create a turbulent condition in the extracting zone by causing too much motion of the contact means because such will cause axial movement of the immiscible phases. Normally the angle of oscillation will be in the range of 4° to 100°, preferably 10° to 50°, and the frequency of oscillation will be from 50 to 500 per minute, preferably 50 to 300 per minute. When screens are employed to extend substantially the length of the extraction zone and extend substantially in radial directions from the axis or the oscillatable shaft of the apparatus, whether single or double screens, such will normally number from 4 to 100, preferably being from 4 to 50 and more preferably being from 10 to 30. The angle of oscillation depends to an extent on the number of screens and will normally be slightly more than the angle betwen adjacent screens. Thus, for example, if twenty screens are employed such angle would often be about from 22° to 24°. Sometimes angles larger or smaller than the preferred angle will be utilized and on occasion up to 40% greater angles or down to 10% lesser angles may be preferred. Irregular spacings, while operative, are not preferred.

When screening is employed and the contacting means extends radially from the axis of the extraction column (from the oscillating shaft) it will often be desirable to utilize comparatively thick filamentary, wire or rod material as the material of the screen, to give it sufficient strength to maintain its shape, and this is especially important if the extracting column is of substantial radius, e.g., 0.5 to 1 m., or more. However, thinner screening, which sometimes is utilized in multiple layers, can be employed for such larger columns too, preferably with framing to support it. The screening wires are normally round but can be square or rectangular or of other suitable shapes in cross-section, so that the striking or impelling of the immiscible phases by the contacting means will move such phases horizontally, without an axial component. Whether screens or other means, such as wrapped de-misting materials, previously mentioned, are employed, the contacting means will usually extend between the inlets to the column (the distributor portion thereof) a distance of about 80 to 99% of the inter-inlet distance, preferably 90 to 99% thereof. With respect to the entire height of the column the screens often extend from 50 to 95% thereof, preferably 70 to 95% thereof, the balance of such height being taken up by the settling zones. The screens will normally extend to within ½ to 10 mm. of the inner wall of the cylindrical column, or to a distance which is about 0.1 to 3% of the diameter (of the inner wall) of the column. When the contacting means is of a woven filamentary material or equivalent that is wrapped about the oscillating shaft it will usually extend to within about one cm. of the wall of the column. Alternatively, any of the contacting means may be of such structure that it rubs against such inner wall.

A particularly useful contact promoting means, which has been found especially suitable for extracting glycerine from a soap containing 25 to 35% of water, at an elevated temperature and in a liquid state, with an aqueous electrolyte solution comprising sodium chloride and sodium hydroxide, is one wherein the number of screens is about 20, the screen openings are about 6 mm., the screens extend within about 2 mm. of the inner wall of the cylinder, the angle of oscillation is about 25° and the frequency of oscillation is about 220 per minute (220 cycles).

The process aspect of the invention is applicable to a wide variety of extractable materials and extracting media, usually solvents. In all such processes, in addition to impacting the dispersed phase it is important to impart oscillating horizontal mixing motion to both phases, preferably but not necessarily rotationally (with respect to the extraction zone axis). While the preferred apparatus has a single oscillating shaft, it is within the invention to utilize several of these distributed across the cross-section of the column but when using such multiple contact promoting means care should be taken to avoid any turbulence and axial flow that could result from it. Also, there are some sections of the cross-sectional area of the extracting zone where such contacting means will not impinge on the immiscible phases, thereby diminishing extracting efficiency. However, in large columns, where the frequency of oscillation or the size of the contacting means may be limited, it may be desirable to employ plural contacting means, each with its central vertical shaft, oscillating horizontally. Of course, since the concept of the present invention is to impart oscillating horizontal motion to the immiscible phases in an extraction zone of a countercurrent extractor to improve the extraction rate, other means than a a rotationally oscillating shaft can also be employed.

Thus, for columns of different types of cross-sections, such as rectangular or square, linear oscillators may be utilized with screens or other contact means held to them.

The present process is applicable to a side range of extractions, which may be conducted under atmospheric pressure or higher pressures. Particulate materials, such as aromatic wood particles, e.g., sandalwood, may be leached or solvent extracted. As examples of liquid-liquid extractions there may be mentioned removals of dyes and flavors from aqueous media with organic solvents and the extraction of paraffinic materials from oils with suitable immiscible preferential solvents. A multitude of other examples of suitable extractions is known to the art and needs not be mentioned here. Various such systems are detailed in *Chemical Engineers' Handbook*, 4th Edition (Perry, Chilton and Kirkpatrick), published by McGraw-Hill Book Company (1963) at pages 14–45 through 14–55. Such publication also briefly describes solvent extraction and relevant theories thereof at pages 14–40 through 14–44.

A preferred process on which the apparatus and process of this invention have been tested is the extraction of glycerine from soap with lye. As soap is manufactured, whether by kettle or non-kettle saponification process, when fats and/or oils are saponified glycerine is produced and dissolves in the aqueous soap resulting (which often has a content of 65 to 75% of soap, with the balance being water and glycerine). With the glycerine removed, such soap will usually contain from about 65 to 73% of soap, with the balance being water. Water is miscible with the soap, which is in liquid state at elevated temperature, so water alone cannot be used as the extracting means. Consequently, lye is employed, which is a mixture of an aqueous solution of sodium chloride and sodium hydroxide, which is immiscible with the liquid state soap.

The soap, which is the more viscous, discontinuous phase for the extraction, is a neat soap which contains from about 15 to 32% of water and about 3 to 15% of glycerine. It is charged to the extractor at a temperature in the range of 80° to 102° C., preferably being in the range of 90° to 95° C. The electrolyte solution in water is at a concentration of about 5 to 20% of sodium chloride and/or sodium hydroxide, with a mixture of both electrolytes being preferred. In such preferred mixture the proportion of sodium chloride to sodium hydroxide will usually be within the range of 1:1 to 10:1, preferably 2:1 to 5:1. More NaOH than normal may be present in the electrolyte to saponify any free fat or oil present with the soap, and the ration of NaCl:NaOH and the concentrations of both may be varied for best operations with particular types of soaps (of different cocotallow ratios). The electrolyte solution will be charged to the extracting zone at a temperature in the range of 80° to 102° C., preferably 90° to 95° C. and the temperature in the extraction column will be maintained in the range of 85° to 102° C., preferably being 90° to 95° C., with the column often being insulated and/or controllably heated to maintain and/or regulate such temperature. The ratio by weight of the soap feed to the electrolyte solution charged will normally be in the range of 1:1 to 3:1, preferably being within the range of 3:2 to 5:2. The soap charged will normally be a sodium soap of higher fatty acids of 10 to 18 carbon atoms, such as one of a mixture of tallow and coconut oil, wherein the proportion of tallow will usually be from 50 to 95%, preferably 50 to 85%, but soaps made from other fats and oils may also have glycerine removed from them by the present method. In the processes of the present invention, utilizing the countercurrent extraction column previously described, with the contact promoting means of this invention therein, the soap removed from the extraction zone will contain from 0 to 4% of glycerine and the withdrawn aqueous electrolyte will contain from 10 to 25% of glycerine. Ideally, the glycerine content of the soap will be less than 1% and that of the lye will be near to 20% or more, due to the high extraction efficiency of the present process.

The major advantages of the present invention are in increasing the concentration gradient of the extractable material (by mixing) and promoting more intimate contact between the dispersed and continuous phases in the extraction zone, thereby achieving a much higher extraction efficiency than was previously attainable. For example, utilizing a laboratory type extraction column of the present invention with oscillating screens therein, for a column height of about 2.4 meters the efficiency of extraction is equivalent to that of about $3\frac{1}{2}$ theoretical stages. This is about four times the extraction efficiency of the rotating disc column and about seven times the efficiency of a pulsed column. Such significant improvements over prior art extraction systems is phenomenal. It is attributed to the unique contacting action of the oscillating horizontal contacting means, which mixes the phases, maximizes contacts between the phases and causes the changings of shapes of the dispersed phase droplets, thinning of any stagnant film and the exposures of renewed contact surfaces of the immiscible phases, especially of the dispersed phase, thereby facilitating mass transfer of the extractable material from the dispersed phase into the continuous phase, as in the soap-glycerine application described above. The employment of screening or equivalent material with openings therein allows oscillatory movement of the contacting means without excessive power consumption and without the production of undesired turbulence, while still providing many surfaces to impinge on or propel the materials in the column. The presence of openings of sufficient size in the contacting means also prevents screen blockages (the sizes of any particulate material present will be less than the size of the screen opening). The viscosities of the phases and the droplet sizes of the dispersed phase, when such is a liquid, will be such as to inhibit such screen blockages, too. The horizontal movement of the contacting means is controlled and does not cause turbulence, swirling motions or axial mixing, and thereby improves the efficiency of extraction. Any material impelled in one direction by the oscillating screen or other contact means, is then moved back to its initial position by the balance of the oscillatory motion. Thus, the net effect is that no swirling or helical movement occurs and the general axial movements of the phases are the same as they would be without employment of the oscillating contact promoting means, except that a much higher efficiency is obtained.

In the present specification and in the claims various terms have been employed which will now be further defined or explained. For simplicity's sake the word "immiscible" has been used to include partially immiscible. "Raffinate" describes the removed feed material from which some of all of the extractable material has been removed, whether the feed is in liquid or particulate form. "Filamentary" denotes thick filaments, wires and rods, as well as those which are thin. "Woven"

includes knitted or otherwise processed into fabric, screen or similar form. Various other words and terms employed in the specification should be given their broadest reasonable meanings consistent with the teachings herein.

The following example illustrates but does not limit the invention. Unless otherwise states all parts are by weight and all temperatures are in °C.

EXAMPLE

Utilizing a continuous extraction apparatus essentially like that shown in FIG. 1, measuring 2.4 meters by 0.15 m. and equipped with twelve screens radially positioned and set apart 30°, a soap containing glycerine is extracted with lye. The extraction column is cylindrical in shape and the screens are flat, with openings therein of about 3 mm. across and with wire diameters of about 1.5 mm. The screening is square woven and is rigidified by external framing which is joined to a rotationally oscillating shaft which moves the screening horizontally. The angle of oscillation is 37° and the frequency is 220 oscillations per minute.

The soap charged is one produced in an automatic saponification apparatus from sodium hydroxide and a mixture of three parts of tallow and one part of coconut oil. It contains about 6% of unsaponified fats and oils, 6.8% of glycerine and 30% of water. The lye contains 8.9% of sodium chloride and 4.2% of sodium hydroxide, with the excess sodium hydroxide being useful in part to saponify the unsaponified oils and fats in the soap.

The soap column is maintained at atmospheric pressure and the temperature is monitored to be within the 90° to 95° C. range (actually 91° to 94° C.) during the five hours of the run. The soap and lye are continuously charged at temperatures within the range of 90° to 95° C., too. The feed rate of lye to the column is maintained at about 23 kg./hr. while that of the soap is held at an average of about 46 kg./hr. The soap withdrawn contains about 0.3% of glycerine and the lye contains about 18% thereof. The concentration of glycerine in the the lye may be increased by using the lye with additional sodium hydroxide in the soap making stage. The mixture therefrom is permitted to settle separately and the lye separated contains at least 25% glycerine. The soap from that settling operation, preferably containing some unsaponified fat, is fed to the extraction column and the unsaponified fat is saponified by the sodium hydroxide present in the extraction lye.

Calculations show that the extraction column employed, with the oscillating screens operating as described, is the equivalent of 3½ theoretical stages. Of the column height about 0.3 m. at the top and about the same distance at the bottom are taken for settling zones so the effective extraction zone is only 1.8 meters in height. The extraction efficiency of the apparatus is from 4 to 10 times that of other apparatuses including mechanical means for aiding in improving the contactings of the immiscible phases of the feed and solvent.

When the above described apparatus is modified as shown in FIG. 3, by incorporating wrapped de-mister wire, such as that manufactured by the York Demister Company and usually employed for de-misting exhaust stacks or vents, similar efficiencies are obtained and in both cases power consumption is low and axial displacement of the immiscible phases is minimal.

When the materials charged are varied, so that finely divided aromatic wood or plant particles are employed instead of the soap and when a suitable organic solvent, such as hexane, is employed instead of the lye, good extraction of the aromatic essence (such as pine oil) is obtainable at room temperature and atmospheric pressure. Such good extraction is also obtainable with other liquid-liquid systems, including those in which the phases are partially miscible.

Results achieved by the use of this pilot plant column are also obtainable with the laboratory apparatus illustrated in FIG. 3, utilizing either the wrap-around packing or the radially positioned screens. Such results can also be obtained by varying the number of screens, changing the angle of oscillation and changing the frequency of oscillation, within the ranges given in the preceding specification. It is considered that even better extractions and possibly greater extraction efficiencies will result from use of a plant-sized apparatus, presently under construction.

The invention has been described with respect to various examples and illustrations thereof but is not to be limited to these because it is evident that one of skill in the art, with the present specification before him, will be able to utilize substitutes and equivalents without departing from the invention.

What is claimed is:

1. A process for extracting an extractable material from a liquid or particulate feed material with an extracting liquid which is immiscible with the feed material, is in a different density from it and from the raffinate resulting from the extraction, which comprises passing a feed material containing an extractable material vertically in one direction through a cylindrical, unbaffled, extraction zone; passing an extraction liquid vertically through said zone in an opposite direction in such manner that the immiscible liquids are maintained in contact in said zone by impacting the materials with a contact promoting means comprising a contacting member of a mesh, woven or filamentary structure with openings therein representing at least 60% of the area of said structures which moves horizontally and oscillatingly through said reaction zone whereby substantially only rotational oscillating horizontal motion with a minimal axial component is imparted to the material in the extraction zone in order to facilitate mass transfer of the extractable material by mixing said phases, maximizing contacts between the phases, causing changings of the shapes of the dispersed phase droplets, thinning any stagnant film and exposing renewed contact surfaces of said phases without causing turbulence, swirling or helical movement.

2. A process according to claim 1 wherein said extraction zone extends between the inlets for said feed material and said extracting liquid, said reaction zone is of a height of 50% to 95% of the height of the reaction column and said rotational, oscillating, horizontal motion is maintained throughout said zone, the angle of oscillation being from 4° to 100° and the frequency of oscillation being 50 to 300 per minute.

3. A process according to claim 1 wherein the feed material is a soap at an elevated temperature and in liquid state, the extractable material is glycerine and the extracting liquid is an aqueous electrolyte solution.

4. A process according to claim 3 wherein the liquid soap feed contains a minor proportion of water and is at a temperature in the range of 80° C. to 102° C., the electrolyte solution as charged to the extracting zone is at a temperature in the range of 80° C. to 120° C., the temperature of the extraction zone is maintained in the range of 85° C. to 102° C. by controlling heating thereof, the ratio by weight of soap feed to electrolyte solution charged is from 1:1 to 3:1, the soap is a sodium soap of higher fatty acids of 10 to 18 carbon atoms, as charged the soap contains from 3 to 15% of glycerine, the extracting electrolyte solution contains from 5 to 20% of sodium chloride or sodium hydroxide or mixtures thereof, the soap removed from the extraction zone contains from 0 to 4% of glycerine and the extracting liquid with glycerine that is removed from extracting zone contains from 10 to 25% of glycerine.

5. A continuous, unbaffled, extraction apparatus, useful for extracting extractable material from a liquid or particulate feed material with an extracting liquid which is immiscible with the feed material and is in a different phase, which comprises: a hollow, vertical, cylindrical column; first inlet means in an upper or lower part of the column for adding to the column a liquid or particulate feed material containing an extractable material to be extracted therefrom; first outlet means for removing from the other such part of the column a raffinate of the feed material of a reduced content of the material to be extracted; second inlet means for adding to the part of the column from which the raffinate is removed an extracting liquid which is immiscible with and of a different density from both the feed material and the raffinate, being heavier or lighter than both; second outlet means for removing such extracting liquid, with extracted material therein, from the part of the column in which the feed liquid is added; and movable contact promoting means in the column comprising a vertical shaft coaxial with the column which is rotationally oscillatable, means for oscillating said shaft and a contacting member of a mesh, woven or filamentary structure with openings therein representing at least 60% of the area of said structure, said contacting member being held to and extending from the shaft to near the inner wall of said column and consisting of a plurality of vertical, radially extending members, said contact promoting means imparting substantially only rotationally oscillating horizontal motion to the immiscible phases with a minimum of undesirable axial mixing in the extraction zone of the column, thereby facilitating mass transfer of the extractable material by mixing said phases, maximizing contacts between the phases, causing changings of the shapes of the dispersed phase droplets, thinning any stagnant film and exposing renewed contact surfaces of said phases without causing turbulence, swirling or helical movement.

6. An extraction apparatus according to claim 5 wherein the first inlet and the second outlet are near the bottom of the column, the first outlet and the second inlet are near the top of the column, the number of vertically extending members is from 4 to 50, the angle of oscillation is from 4° to 100° and the frequency of oscillation is from 50 to 300 per minute.

7. An extraction apparatus according to claim 6 wherein the vertically extending members are of screening having openings in the range of 1 to 30 mm. across and said screening extends from 50% to 95% of the height of the column and extends to a distance from the inner wall of the cylinder which is within the ranges of about 0.5 to 10 mm. and about 0.1 to 3% of the diameter of the inner wall of the cylindrical column.

8. An extraction apparatus according to claim 7 wherein portions of the column are present above and below the contact promoting vertically extending screens, from which portions raffinate and extract are removable, respectively, the areas of the screen openings are in the range of from 60% to 80% of the areas of the screens and the angle of oscillation is from 10° to 50°.

9. An extraction apparatus according to claim 6 wherein said contacting member extends between the inlets to the column and is a height of from 50% to 95% of the height of the column.

10. An extraction apparatus according to claim 9 wherein said contracting member extends between the inlets to the column, and is of a height of from 70% to 95% of the height of the column and said mesh structure has openings of 4 mm. to 15 mm.

* * * * *